(12) United States Patent
Chiu et al.

(10) Patent No.: US 8,700,852 B2
(45) Date of Patent: Apr. 15, 2014

(54) PROCESSING READ AND WRITE REQUESTS IN A STORAGE CONTROLLER

(75) Inventors: Lawrence Y. Chiu, San Jose, CA (US);
Yu-Cheng Hsu, Tucson, AZ (US);
Sangeetha Seshadri, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 12/699,805

(22) Filed: Feb. 3, 2010

(65) Prior Publication Data
US 2011/0191540 A1 Aug. 4, 2011

(51) Int. Cl.
*G06F 13/16* (2006.01)
(52) U.S. Cl.
USPC .................... 711/118; 711/115; 711/E12.017
(58) Field of Classification Search
USPC .................................................. 711/115, 118
See application file for complete search history.

(56) References Cited

U.S. PATENT DOCUMENTS

| | | | |
|---|---|---|---|
| 6,275,897 B1 * | 8/2001 | Bachmat | 711/114 |
| 6,587,921 B2 | 7/2003 | Chiu et al. | |
| 7,136,966 B2 | 11/2006 | Hetrick | |
| 7,165,096 B2 | 1/2007 | Soltis | |
| 7,424,587 B2 | 9/2008 | Caulkins et al. | |
| 7,653,792 B2 * | 1/2010 | Shimada et al. | 711/152 |
| 2003/0145136 A1 | 7/2003 | Tierney et al. | |
| 2006/0004957 A1 | 1/2006 | Hand, III et al. | |
| 2006/0080501 A1 | 4/2006 | Auerbach et al. | |
| 2007/0033433 A1 | 2/2007 | Pecone et al. | |
| 2007/0106842 A1 | 5/2007 | Conley et al. | |
| 2008/0126885 A1 | 5/2008 | Tangvald et al. | |
| 2008/0168234 A1 | 7/2008 | Gill et al. | |
| 2008/0215828 A1 | 9/2008 | Caulkins | |

OTHER PUBLICATIONS

T. Bisson, et al., "Reducing Hybrid Disk Write Latency with Flash-Backed I/O Requests", IEEE Computer Society, 2007, pp. 402-409.

* cited by examiner

*Primary Examiner* — Kenneth Lo
(74) *Attorney, Agent, or Firm* — Konrad Raynes Davda & Victor LLP; David W. Victor

(57) ABSTRACT

Provided are a method, system, and computer program product for processing read and write requests in a storage controller. A host adaptor in the storage controller receives a write request from a host system for a storage address in a storage device. The host adaptor sends write information indicating the storage address updated by the write request to a device adaptor in the storage controller. The host adaptor writes the write data to a cache in the storage controller. The device adaptor indicates the storage address indicated in the write information to a modified storage address list stored in the device adaptor, wherein the modified storage address list indicates modified data in the cache for storage addresses in the storage device.

24 Claims, 9 Drawing Sheets

US 8,700,852 B2

PROCESSING READ AND WRITE REQUESTS IN A STORAGE CONTROLLER

BACKGROUND OF THE INVENTION

1. Field of the Invention

The present invention relates to a method, system, and computer program product for processing read and write requests in a storage controller.

2. Description of the Related Art

A storage controller handles write and read requests from host systems to attached storage devices by buffering write data and requested read data in a cache to accommodate latency in retrieving data from magnetic disk and tape storage devices. Write data may be buffered in the cache and complete may be returned to the write request when the data is stored in cache, before the write data is destaged to the underlying storage device. The storage controller also typically includes a processor, host adaptor providing communication to one or more hosts, and a device adaptor providing communication with a storage subsystem. The host and device adaptors interact with the processor to buffer read and write data in the cache.

The use of a cache to buffer read and write data was developed to reduce latency in processing the read/write request for storage devices having high latency access, such as tape drives and magnetic disk drives. However, the presence of uncommitted data (dirty data) in the write cache results in increased read latency for cache misses since the write cache must be visited to check for uncommitted data for the requested storage address on every read request. There is a need in the art for improved techniques for processing read and write requests in a storage controller to further reduce the latency and improve read/write performance.

SUMMARY

Provided are a method, system, and computer program product for processing read and write requests in a storage controller. A host adaptor in the storage controller receives a write request from a host system for a storage address in a storage device. The host adaptor sends write information indicating the storage address updated by the write request to a device adaptor in the storage controller. The host adaptor writes the write data to a cache in the storage controller. The device adaptor indicates the storage address indicated in the write information to a modified storage address list stored in the device adaptor, wherein the modified storage address list indicates modified data in the cache for storage addresses in the storage device.

DETAILED DESCRIPTION

Figure 1:
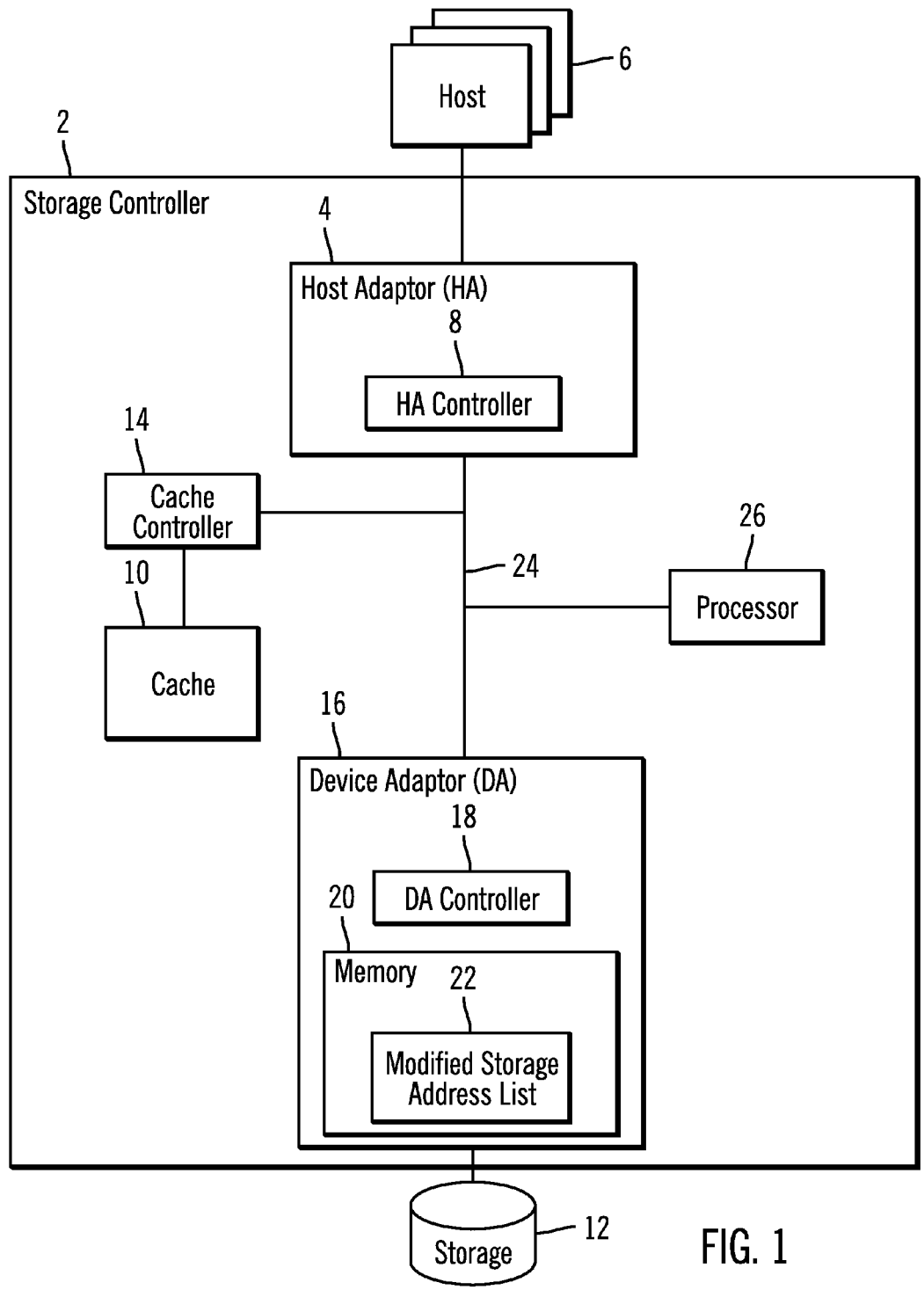
FIG. 1 illustrates an embodiment of a computing environment.

FIG. 1 illustrates an embodiment of a storage controller 2 having a host adaptor (HA) 4 to communicate with one or more host systems 6. The host adaptor 4 has an HA controller 8 to perform host adaptor 4 operations and provide communication with host systems 6. A cache 10 stores data being transferred between the host systems 6 and a storage 12. A cache controller 14 manages access to the cache 10. A device adaptor (DA) 16 provides connection to the storage 12. The device adaptor 16 has a DA controller 18 to perform device adaptor 16 operations and a working memory 20 to store parameters and information being used during device adaptor operations, including a modified storage address list 22. The modified storage address list 22 indicates storage addresses, e.g., tracks or blocks, in the storage 12, for which modified data is stored in the cache 10. The host adaptor 4, cache controller 14, and device adaptor 16 may communicate over a bus 24.

The host 4 and device 16 adaptors may allow communication using different communication protocols known in the art, such as Fibre Channel, Internet Protocol (IP), Small Computer System Interface (SCSI), etc. The storage 12 may be comprised of one or more storage devices, such as a solid state device comprised of solid state electronics, such as an EEPROM (Electrically Erasable Programmable Read-Only Memory), flash memory, flash disk, etc., magnetic storage disk, optical disk, tape, etc. The cache 10 may comprise one or more volatile or non-volatile memory devices. The storage controller 2 may include additional components such as a processor 26 that executes an operating system to perform storage controller 2 operations. The storage controller 2 may comprise a server, enterprise storage server, blade server, storage controller card, etc. The host systems 6 may comprise computer devices known in the art, such as workstations, personal computers, laptops, servers, personal digital assistants (PDAs), telephony devices, etc. The HA 8 and DA 18 controllers may be implemented with hardware logic, such as an Application Specific Integrated Circuit (ASIC), or as a programmable processor executing code in a computer readable storage medium.

In certain embodiments where the storage 12 is implemented as a solid state device or other devices, the host adaptor 4 and device adaptor may manage the handling of read and write requests from the host 6 directly and in certain cases bypass the cache 10 to transfer data between the host 6 and the storage 12 to reduce latency and delays incurred by using the cache 10.

Figure 2:
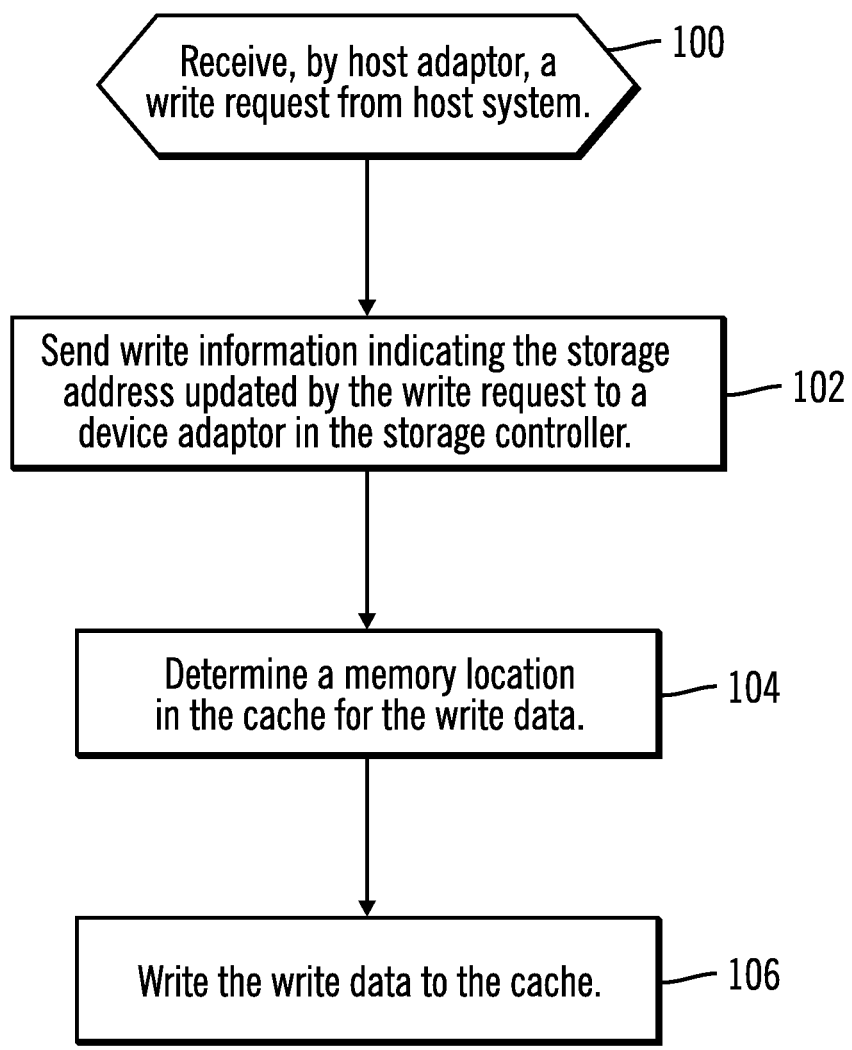
FIG. 2 illustrates an embodiment of operations of a host adaptor to process a write request.

FIG. 2 illustrates an embodiment of operations performed by the HA controller 8 to manage a write operation. Upon receiving (at block 100) a write request from the host 6, the HA controller 8 sends (at block 102) write information indicating the storage address, e.g., logical block address (LBA), track, etc., updated by the received write request to the device adaptor 16 in the storage controller 2. In certain embodiments, the HA controller 8 sends just the write information to the device adaptor 16 and not the write data. The HA controller 8 determines (at block 104) a memory location in the cache 10 for the write data and then writes (at block 106) the write data to the cache 106. In one embodiment, the HA controller 8 may perform a Direct Memory Access (DMA) operation to send the write data to the cache controller 14 to write to the cache 10 to bypass the processor 26. Alternatively, the HA controller 8 may interact with the processor 26 to transfer the data to the cache 14. After writing the data to the cache 10, the data may later be destaged from the cache 10 to the storage 12.

Figure 3:
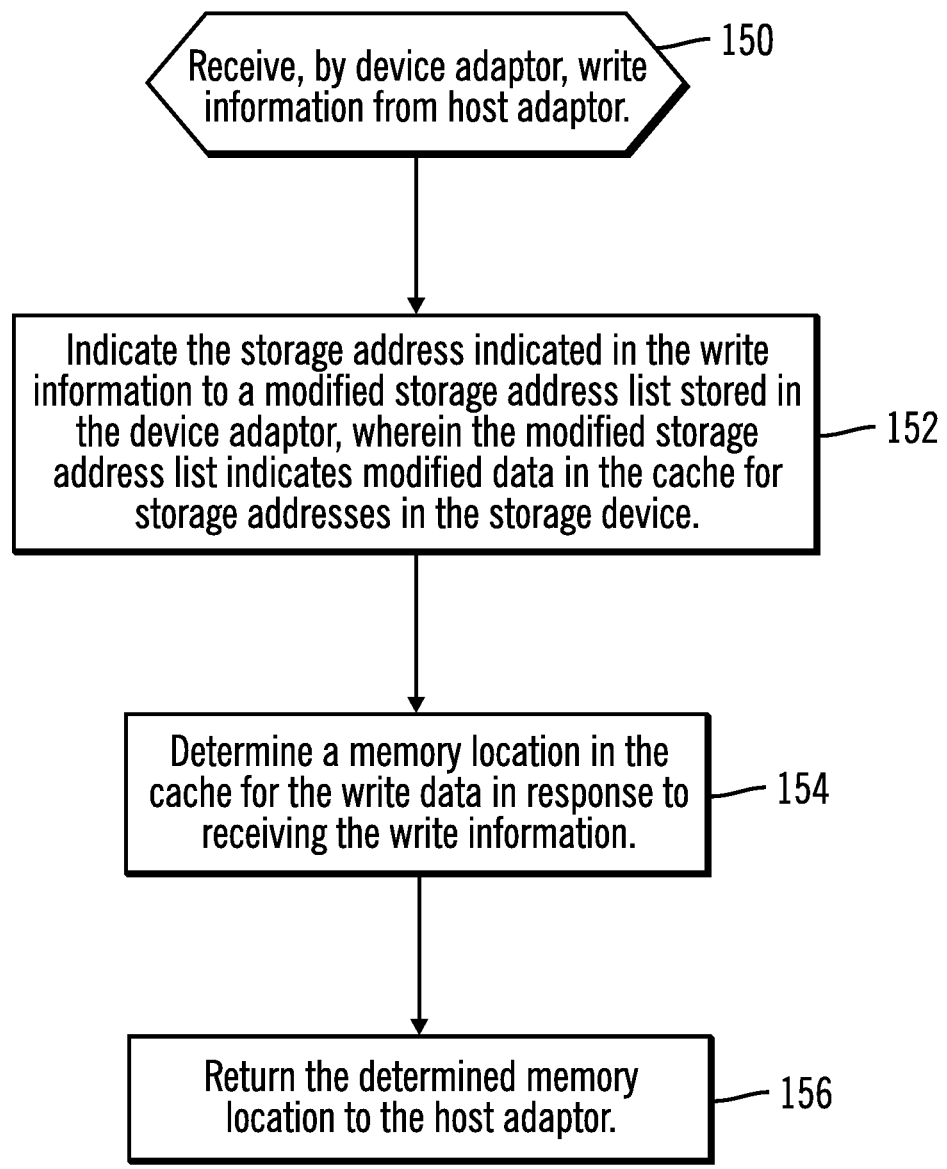
FIG. 3 illustrates an embodiment of operations of a device adaptor to process write information from the host adaptor.

FIG. 3 illustrates an embodiment of operations performed by the DA controller 18 to process the write information from the host adaptor 4 sent at block 102 in FIG. 2. Upon the device adaptor 16 receiving (at block 150) the write information from the host adaptor 4, the DA controller 18 indicates (at block 152) the storage address indicated in the write information in the modified storage address list 2 to record the address in the storage 12 of the modified data the host adaptor sent to the cache 14, i.e., new dirty data in the cache 10, due to the write processed according to FIG. 2. In one embodiment, the DA controller 18 may determine (at block 154) a memory location in the cache 10 for the write data in response to receiving the write information and then return that determined memory location to the host adaptor 4 to use to write to the cache 10. In an alternative embodiment, the HA controller 8 may send the write information to the device adaptor 16, but communicate directly with the cache controller 14 to obtain a memory location in the cache 10 to use for the write.

Figure 4:
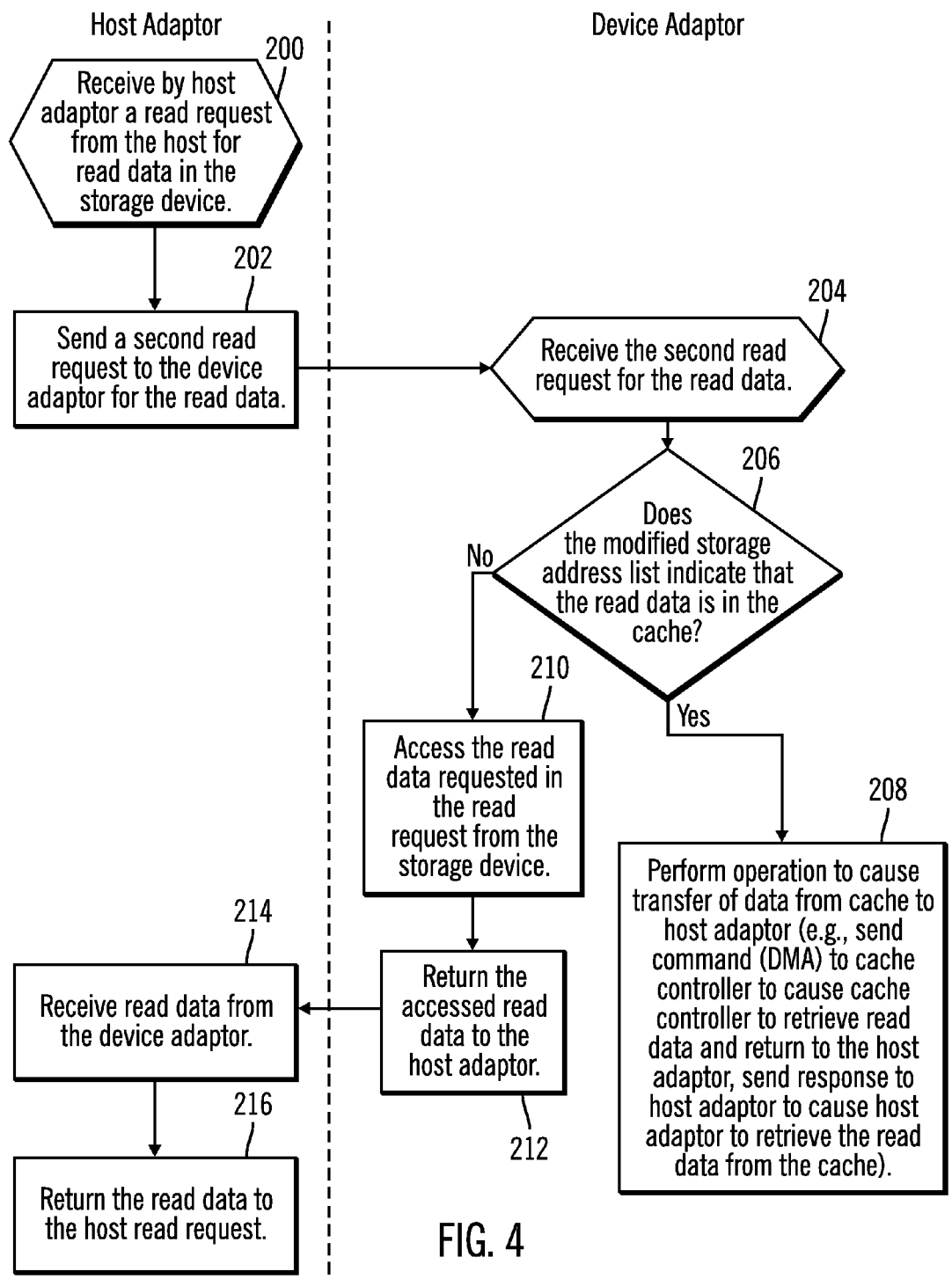
FIG. 4 illustrates an embodiment of operations of a host adaptor and device adaptor to process a read request from a host system.

FIG. 4 illustrates an embodiment of operations performed by the HA controller 8 and DA controller 18 to process a read request for read data received by the host adaptor 4 from a host system 6. Upon the host adaptor 6 receiving (at block 200) a read request for read data in the storage 12 from a host system 6, the HA controller 8 sends (at block 202) a second read request to the device adaptor 16 for the read data. In response to the device adaptor 16 receiving (at block 204) the second read request, the DA controller 18 determines (at block 206) whether the modified storage address list 22 indicates that a recently modified version of the read data is in the cache 10. The second read request may be the same as the read request from the host 6 or in a different format for the device adaptor 16. If so, the DA controller 18 performs (at bock 208) an operation to cause transfer of the requested data from the cache 10 to the host adaptor 4. This operation may comprise the DA controller 18 sending a DMA command to the cache controller 14 to cause the cache controller 14 to retrieve read data and return to the host adaptor 4 or alternatively send a response to the host adaptor 4 to cause the host adaptor 4 to retrieve the read data directly from the cache 10.

If (at block 206) the modified storage address list 22 indicates that dirty data for the requested read data is not in the cache 10, then the DA controller 18 accesses (at block 210) the requested read data from the storage device 12 and returns (at block 212) the accessed read data to the host adaptor 4. Upon receiving (at block 214) the read data from the device adaptor 16, the HA controller 8 returns (at block 216) the received read data to the host system 6.

In certain embodiments, the host adaptor 4 may opportunistically send the read request to both the device adaptor 16 and the cache controller 14 according to a race based scheme to retrieve the data from the device 10 or 12 that can return the data first to reduce latency in accessing the read data.

Figure 5:
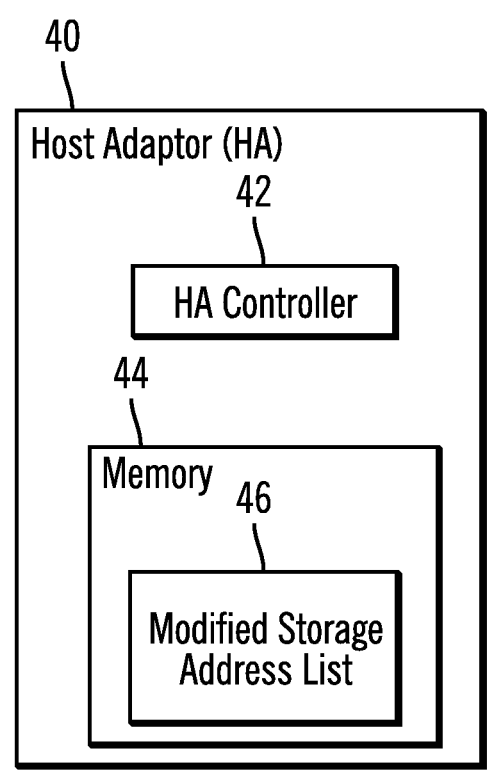
FIG. 5 illustrates an embodiment of a host adaptor.

FIG. 5 illustrates an alternative embodiment of the host adaptor 4 shown in FIG. 1 as host adaptor 40 including a memory 44 and HA controller 42 similar to the memory 20 and HA controller 8 described with respect to FIG. 1 and a modified storage address list 46 similar to the modified storage address list 22 in the device adaptor 16 of FIG. 1. The modified storage address list 46 indicates storage addresses, e.g., tracks or blocks, in the storage 12, for which modified data is stored in the cache 10. In certain embodiments, when a write request is received by the host adaptor 40, such as in FIG. 2, the HA controller 42 may indicate the address of the data being written to the cache 10 in the modified storage address list 46. When a read request arrives (at block 250) at the host adaptor 40 from the host 6, then the HA controller 42 determines whether the requested read data has been written using the modified storage address list 46. When dirty data in the cache 10 is destaged to storage 12, then the device adaptor 16 or cache controller 14 may notify the host adaptor 40 so that the host adaptor 40 may update its modified storage address list 46 to indicate that the destaged track is not in the cache 10.

Figure 6:
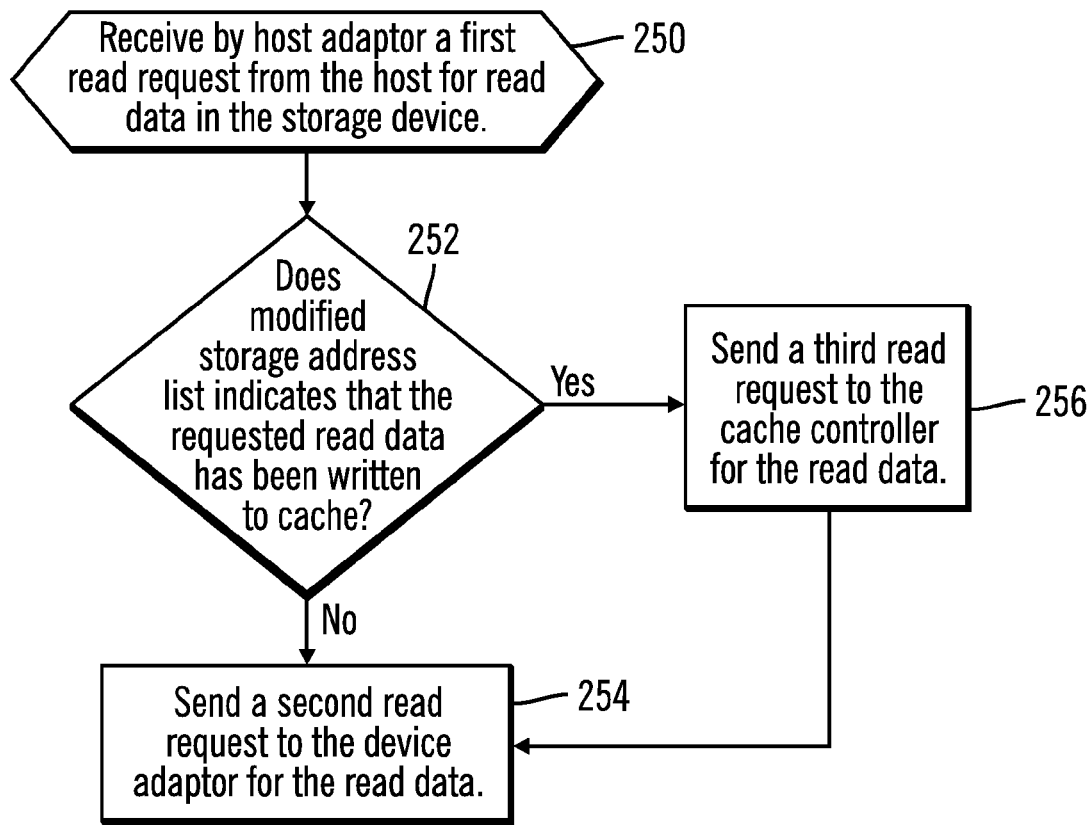
FIG. 6 illustrates an embodiment of operations of a host adaptor to process a read request from a host system.

FIG. 6 illustrates an embodiment of operations performed by the HA controller 8 to determine when to opportunistically send read requests to both the device adaptor 16 and cache controller 14 to reduce latency. Upon receiving (at block 250) the read request, the HA controller 8 determines (at block 252) whether the modified storage address list 46 indicates that the requested read data has been recently modified. If not, the HA controller 8 only sends (at block 254) a second read request for the read data to the device adaptor 16 to process. If (at block 252) the requested read data has been recently updated, as indicated in the modified storage address list 46, then the HA controller 8 additionally sends (at block 256) a third read request to the cache controller 14 for the requested read data as well as the second read request to the device adaptor 16. In an alternative embodiment, the HA controller 8 may opportunistically send the read requests to both the cache controller 14 and device adaptor 16. Further, the HA controller 42 may opportunistically send requests to both the cache controller 14 and device adaptor 16 without checking whether the requested read data has been modified recently so as to be likely stored in the cache 10. In certain embodiments, the HA controller 8, 42 may send asynchronous read requests to the cache controller 14 and device adaptor 18.

Figure 7:
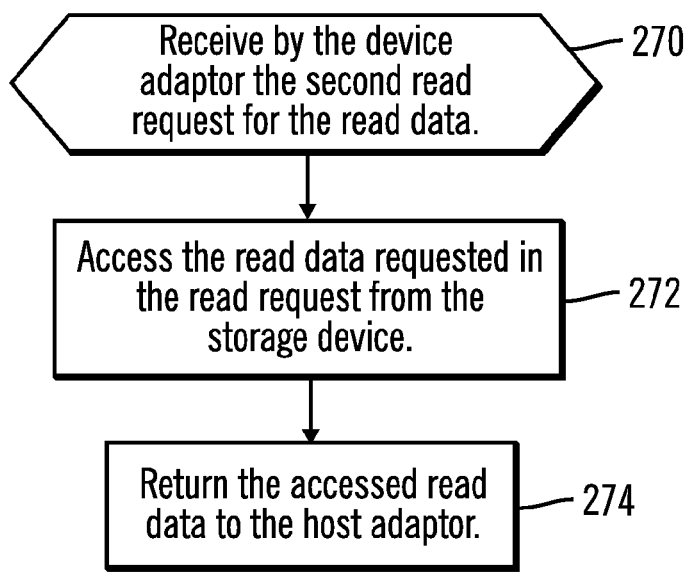
FIG. 7 illustrates an embodiment of operations of a device adaptor to process a read request from the host adaptor.

FIG. 7 illustrates an embodiment of operations performed by the DA controller 18 to process a read request for read data from the host adaptor 4. Upon receiving (at block 270) the second read request, the DA controller 18 may access (at block 272) the requested read data from the storage device 12 and return (at block 274) to the host adaptor 4 to turn return to the requesting host system 6.

Figure 8:
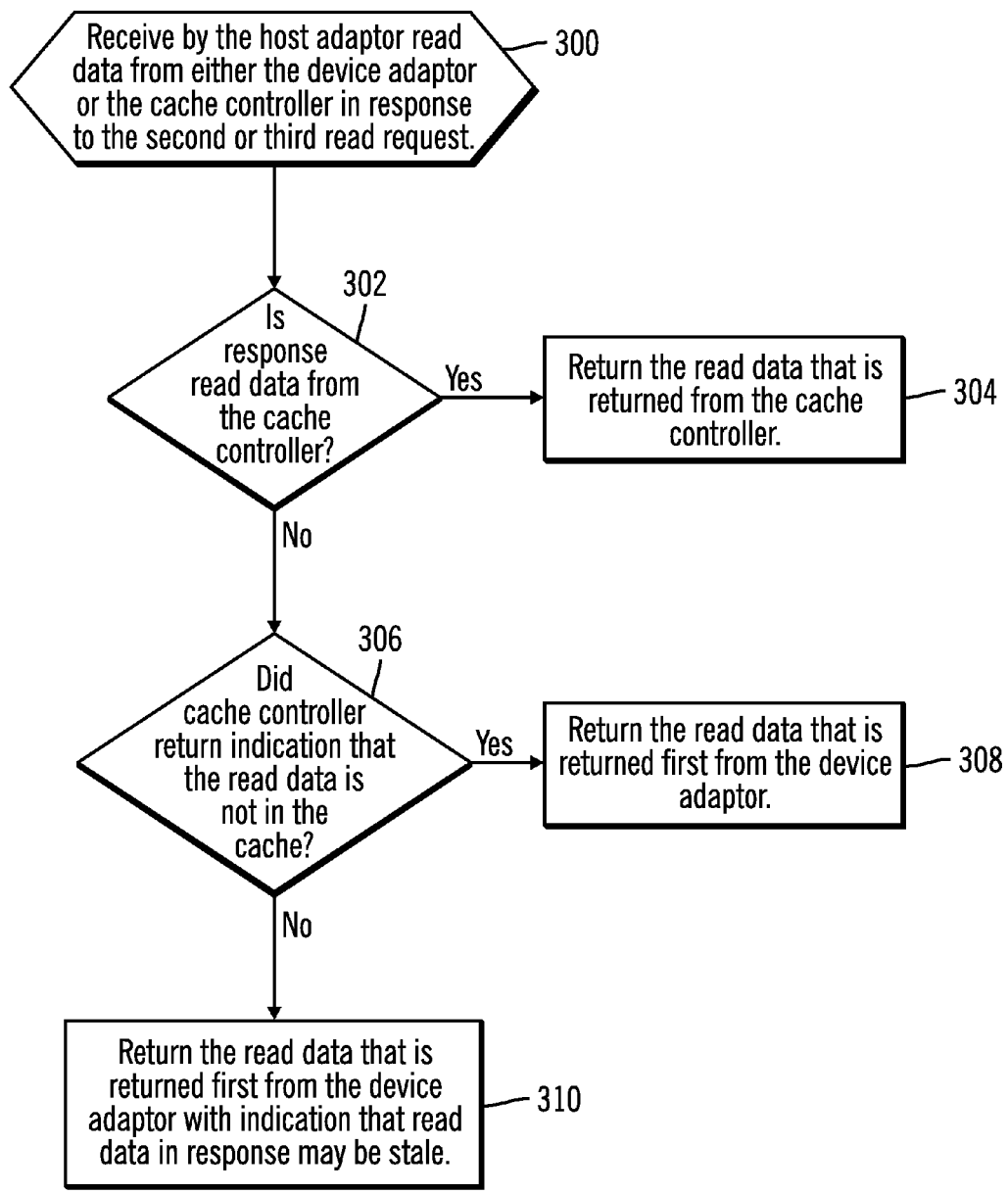
FIGS. 8, 9, and 10 illustrate embodiment of operations of a host adaptor to process returned read data for a read request.

FIG. 8 illustrates embodiment of operations performed by the HA controller 8, 42 to implement a race based read operation for an opportunistic read having relaxed consistency, where the HA controller 8 sends requests for the read data to both the cache controller 14 and the device adaptor 16, such as performed in the operations of FIG. 5. Under a relaxed consistency scheme, the HA controller 8 does not require confirmation from the cache controller 14 that read data received from the device adaptor 16 is the most current version of that data before returning the read data to the host 6 request. With relaxed consistency stale data may be returned, but the host 6 application may not require the most current data for operations. Control begins with the HA controller 8, 42 receiving (at block 300) read data from either the device adaptor 16 or the cache controller 14, retrieving from cache 10, in response to the second or third read request sent according to the operations of FIG. 5. If (at block the 302) read data is returned from the cache controller 14, then the HA controller 8, 42 returns (at block 304) the read data from the cache 10 to the host 6 read request, because the cache 10 would have the most current version of the data, i.e., dirty data. If (at block 302) the read data was from the device adaptor 16 (No branch of block 306) and the HA controller 8, 42 has indication (at block 306) that the cache controller 14 returned indication that the read data is not in the cache 10, then the HA controller 8, 42 returns (at block 308) the read data from the device adaptor 16. If the HA controller 8, 42 determines (at block 306) that the cache controller 14 has not returned indication that the cache 10 does not have the data, then the HA controller 8, 42 returns (at block 310) the read data from the device adaptor 10 and, in certain embodiments, may indicate that that the returned read data may be stale. At block 310, the read data from the device adaptor 16 may be stale because the cache controller 14 has not confirmed that the cache 10 does not have dirty data. However, to reduce latency in the relaxed consistency condition, the host adaptor 4, 40 returns the data anyway.

Figure 9:
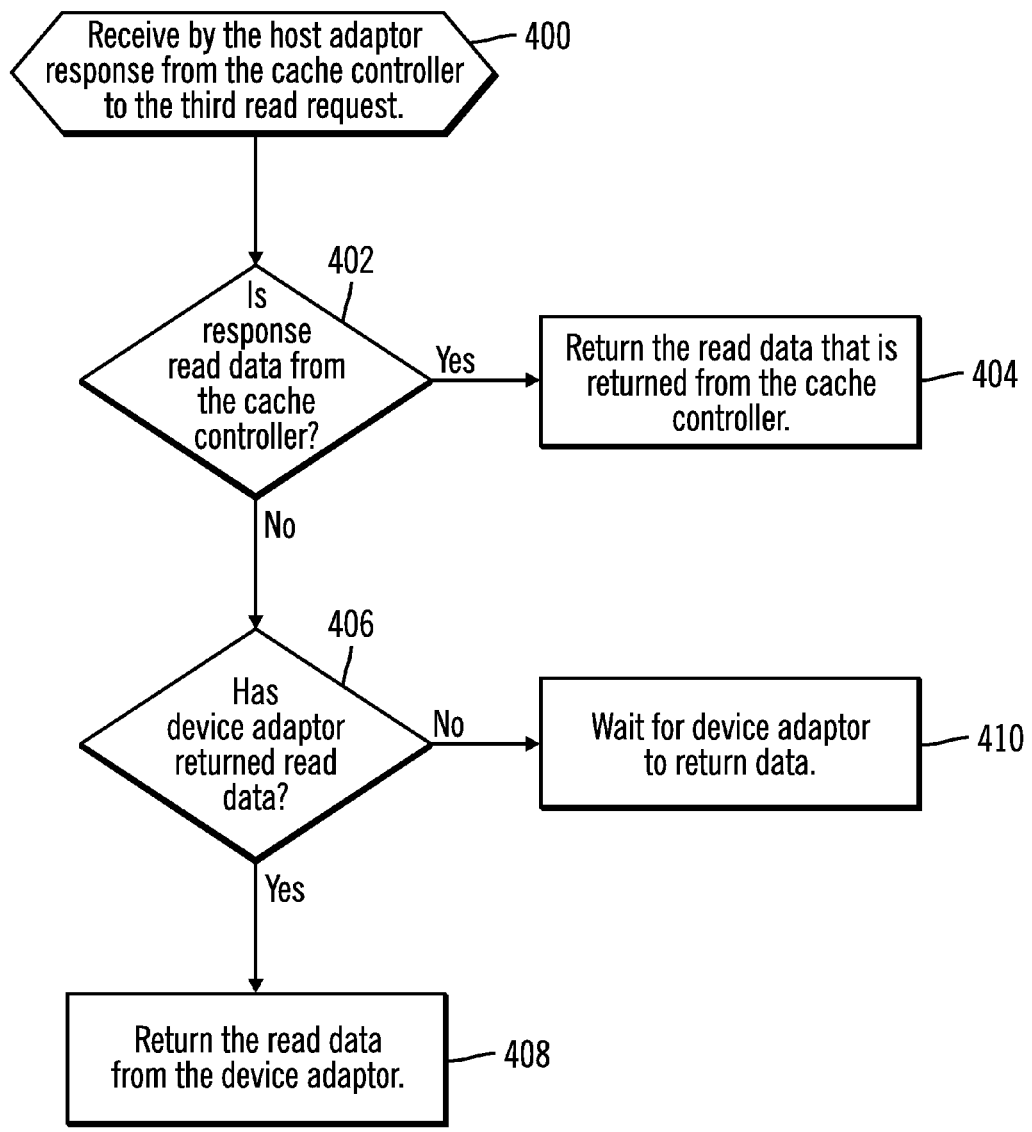
Figure 10:
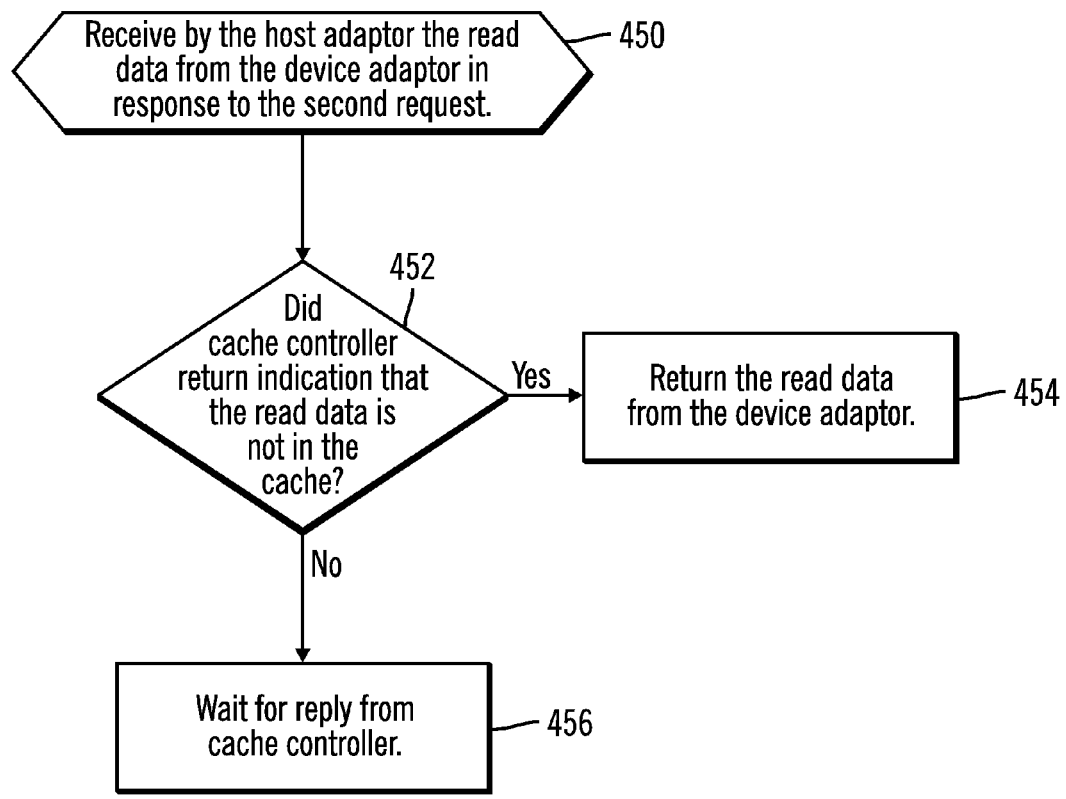

FIGS. 9 and 10 illustrate an embodiment of operations performed by the HA controller 8, 42 to implement a race based read operation for an opportunistic read having strict consistency, where the read request is sent to both the cache controller 14 and the device adaptor 16, such as performed in the operations of FIG. 5. Under a strict consistency requirement, the HA controller 8, 42 requires confirmation from the cache controller 14 that the cache 10 does not have a more current version of the read data received from the device adaptor 16 before returning the read data to the host 6 request. With strict consistency, stale data may not be returned due to the requirements of the host 6 application for the most current version of the requested read data.

With respect to FIG. 9, control begins with the HA controller 8, 42 receiving (at block 400) a response from the cache controller 14 to the third read request sent according to the operations of FIG. 6. If (at block the 402) read data is returned from the cache controller 14, then the HA controller 8, 42 returns (at block 404) the read data from the cache 10 to the host 6 read request, because the cache 10 would have the most current version of the data, i.e., dirty data. If (at block 402) the response form the cache controller 14 indicates that the read data is not in the cache 10 (from the No branch of block 402) and if (at block 406) the device adaptor 16 previously returned the read data, then the HA controller 8, 42 returns (at block 408) the read data from the device adaptor 16 to the requesting host 6. Otherwise, if (at block 406) the device adaptor 16 has not returned the requested read data from the storage 12, then the HA controller 8, 42 waits for the device adaptor 16 to return the requested read data from the storage 12.

With respect to FIG. 10, control begins with the HA controller 8, 42 receiving (at block 450) the returned read data from the device adaptor 16, which the device adaptor 16 obtains from the storage 12. If the HA controller 8, 42 determines (at block 452) that the cache controller 14 previously returned indication that the read data is not in the cache 10, then the HA controller 8, 42 returns (at block 412) the read data from the device adaptor 16 to the host system 6 read request. If (at block 452) the cache controller 14 did not return indication that the cache 10 does not have the read data, then the HA controller 8, 42 waits (at block 456) for the reply from the cache controller 14 to ensure that only the most current version of the requested data is returned to the host 6.

Described embodiments provide for the host and device adaptors to handle read requests without going through the cache if the read data is accessed by the device adaptor to minimize latency delays that would occur in having to buffer the data read from storage in the cache before returning to the host adaptor. Further embodiments, have the host adaptor opportunistically request read data from both the cache controller and the device adaptor to obtain the read data with minimal latency by creating a race condition between the cache controller and the device adaptor.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 2-4 and 6-10 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer program product for communicating with a storage device and a host system, the computer program product comprising a computer readable storage medium having computer readable program code embodied therein executed by a host adaptor and a device adaptor in a storage controller having a cache to perform operations, the operations comprising:
   receiving, at the host adaptor, a write request from the host system for a storage address in the storage device;
   sending, by the host adaptor, write information indicating the storage address updated by the write request to the device adaptor;
   writing, by the host adaptor, the write data to the cache; and
   indicating, by the device adaptor, the storage address indicated in the write information to a modified storage address list stored in the device adaptor, wherein the modified storage address list indicates modified data in the cache for storage addresses in the storage device.

2. The computer program product of claim 1, wherein the operations further comprise:
   determining, by the device adaptor, a memory location in the cache for the write data in response to receiving the write information;
   returning, by the device adaptor, the determined memory location to the host adaptor; and
   using, by the host adaptor, the received memory location to write the write data to the memory location in the cache.

3. The computer program product of claim 1 further in communication with a cache controller, wherein the operations further comprise:
   requesting, by the host adaptor, a memory location from the cache controller managing access to the cache; and
   using, by the host adaptor, the received memory location from the cache controller to write the write data to the memory location in the cache.

4. The computer program product of claim 1, wherein the operations further comprise:

using, by the device adaptor, the modified storage address list to determine whether to have read data returned to a read request from the host system from the cache or the storage device.

5. The computer program product of claim 4, wherein the operations further comprise:
accessing, by the device adaptor, the read data requested in the read request from the storage device in response to determining that the modified storage address list does not indicate the requested read data as in the cache; and
returning, by the accessed device adaptor, the accessed read data to the host adaptor to return to the host system.

6. The computer program product of claim 4, wherein the operations further comprise:
receiving, by the host adaptor, a first read request from the host system for read data in the storage device;
sending, by the host adaptor, a second read request to the device adaptor for the read data in the storage device; and
sending, by the device adaptor, a response to the host adaptor to cause the host adaptor to retrieve the read data from the cache in response to the device adaptor determining that the modified storage address list indicates that the requested read data is in the cache.

7. The computer program product of claim 4 further in communication with a cache controller, wherein the operations further comprise:
receiving, by the host adaptor, a first read request from the host system for read data in the storage device;
sending, by the host adaptor, a second read request to the device adaptor for the read data in the storage device; and
sending, by the device adaptor, a command to the cache controller to cause the cache controller to retrieve the read data from the cache and send to the host adaptor in response to the device adaptor determining that the modified storage address list indicates that the requested read data is in the cache.

8. The computer program product of claim 4 further in communication with a cache controller, wherein the operations further comprise:
receiving, by the host adaptor, a first read request from the host system for read data in the storage device;
sending, by the host adaptor, a second read request to the device adaptor for the read data in the storage device;
sending, by the host adaptor, a third read request to the cache controller of the cache for the read data in the storage device; and
returning, by the host adaptor, the read data that is returned first from the memory controller or the device adaptor.

9. The computer program product of claim 8, wherein the operations further comprise:
returning, by the host adaptor, indication to the host system that the read data returned first from the device adaptor may be stale in response to first receiving the read data from the device adaptor and in response to determining that the cache controller has not indicated that the read data was not found in the cache.

10. The computer program product of claim 4 further in communication with a cache controller, wherein the operations further comprise:
receiving, by the host adaptor, a first read request from the host system for read data in the storage device;
sending, by the host adaptor, a second read request to the device adaptor for the read data in the storage device;
sending, by the host adaptor, a third read request to the cache controller of the cache for the read data in the storage device;
sending, by the device adaptor, the read data accessed from the storage device in response to the second read request; and
returning, by the host adaptor, the read data returned from the cache controller in response to receiving the read data in the cache from the cache controller.

11. The computer program product of claim 10, wherein the operations further comprise:
returning, by the host adaptor, the read data returned from the device adaptor in response to receiving the read data from the device adaptor and in response to receiving indication from the cache controller that the read data is not in the cache.

12. The computer program product of claim 1, wherein the storage controller includes a plurality of host adaptors, wherein the host adaptors are assigned different addresses in the storage device, and wherein host systems direct read and write requests to storage addresses to the host adaptor assigned to the storage address that is the target of the read or write request.

13. A computer implemented method, comprising:
receiving, at a host adaptor in a storage controller, a write request from a host system for a storage address in a storage device;
sending, by the host adaptor, write information indicating the storage address updated by the write request to a device adaptor in the storage controller;
writing, by the host adaptor, the write data to a cache in the storage controller; and
indicating, by the device adaptor, the storage address indicated in the write information to a modified storage address list stored in the device adaptor, wherein the modified storage address list indicates modified data in the cache for storage addresses in the storage device.

14. The method of claim 13, further comprising:
using, by the device adaptor, the modified storage address list to determine whether to have read data returned to a read request from the host system from the cache or the storage device.

15. The method of claim 14, further comprising:
receiving, by the host adaptor, a first read request from the host system for read data in the storage device;
sending, by the host adaptor, a second read request to the device adaptor for the read data in the storage device;
sending, by the host adaptor, a third read request to a cache controller of the cache for the read data in the storage device; and
returning, by the host adaptor, the read data that is returned first from the memory controller or the device adaptor.

16. The method of claim 15, further comprising:
returning, by the host adaptor, indication to the host system that the read data returned first from the device adaptor may be stale in response to first receiving the read data from the device adaptor and in response to determining that the cache controller has not indicated that the read data was not found in the cache.

17. The method of claim 14, further comprising:
receiving, by the host adaptor, a first read request from the host system for read data in the storage device;
sending, by the host adaptor, a second read request to the device adaptor for the read data in the storage device;
sending, by the host adaptor, a third read request to a cache controller of the cache for the read data in the storage device;

sending, by the device adaptor, the read data accessed from the storage device in response to the second read request; and returning, by the host adaptor, the read data returned from the cache controller in response to receiving the read data in the cache from the cache controller.

18. The method of claim 17, further comprising:

returning, by the host adaptor, the read data returned from the device adaptor in response to receiving the read data from the device adaptor and in response to receiving indication from the cache controller that the read data is not in the cache.

19. A system in communication with a storage device and a host system, comprising:
  a cache;
  a host adaptor;
  a device adaptor;
  a communication interface providing communication among the cache, the host adaptor, and the device adaptor;
  a host adaptor controller in the host adaptor executed to perform operations, the operations comprising:
    receiving, a write request from the host system for a storage address in the storage device;
    sending write information indicating the storage address updated by the write request to the device adaptor;
    writing the write data to the cache; and
  a device adaptor controller in the device adaptor executed to perform operations comprising indicating the storage address indicated in the write information to a modified storage address list stored in the device adaptor, wherein the modified storage address list indicates modified data in the cache for storage addresses in the storage device.

20. The system of claim 19, wherein the device adaptor controller further performs using the modified storage address list to determine whether to have read data returned to a read request from the host system from the cache or the storage device.

21. The system of claim 20, further including a cache controller managing cache operations, wherein the host adaptor controller further performs:

receiving a first read request from the host system for read data in the storage device;

sending a second read request to the device adaptor for the read data in the storage device;

sending a third read request to the cache controller of the cache for the read data in the storage device; and returning the read data that is returned first from the memory controller or the device adaptor.

22. The system of claim 21, wherein the host adaptor controller further performs:

returning indication to the host system that the read data returned first from the device adaptor may be stale in response to first receiving the read data from the device adaptor and in response to determining that the cache controller has not indicated that the read data was not found in the cache.

23. The system of claim 20, further including a cache controller managing cache operations, wherein the host adaptor controller further performs:

receiving a first read request from the host system for read data in the storage device;

sending a second read request to the device adaptor for the read data in the storage device;

sending a third read request to the cache controller of the cache for the read data in the storage device, wherein the device adaptor controller sends the read data accessed from the storage device in response to the second read request; and returning the read data returned from the cache controller in response to receiving the read data in the cache from the cache controller.

24. The system of claim 23, wherein the host adaptor controller further performs:

returning the read data returned from the device adaptor in response to receiving the read data from the device adaptor and in response to receiving indication from the cache controller that the read data is not in the cache.

* * * * *